US00RE49726E

(19) United States
(12) Reissued Patent
Li et al.

(10) Patent Number: US RE49,726 E
(45) Date of Reissued Patent: Nov. 14, 2023

(54) DISPLAY DRIVER AND DISPLAYING METHOD FOR CASCADE APPLICATION

(71) Applicant: Novatek Microelectronics Corp., Hsinchu (TW)

(72) Inventors: Jen-Wei Li, Taichung (TW); Jen-Hao Liao, Hsinchu County (TW)

(73) Assignee: Novatek Microelectronics Corp., Hsinchu (TW)

(21) Appl. No.: 17/546,063

(22) Filed: Dec. 9, 2021

Related U.S. Patent Documents

Reissue of:
(64) Patent No.: 10,872,550
Issued: Dec. 22, 2020
Appl. No.: 16/365,711
Filed: Mar. 27, 2019

(51) Int. Cl.
*G09G 3/20* (2006.01)
*G09G 3/36* (2006.01)

(52) U.S. Cl.
CPC ..... *G09G 3/20* (2013.01); *G09G 3/3685* (2013.01); *G09G 2310/027* (2013.01); *G09G 2310/0243* (2013.01); *G09G 2310/0291* (2013.01); *G09G 2310/0297* (2013.01); *G09G 2320/0276* (2013.01); *G09G 2320/0673* (2013.01); *G09G 2330/028* (2013.01)

(58) Field of Classification Search
CPC ..... G09G 3/20; G09G 3/3685; G09G 2310/0243; G09G 2310/0291; G09G 2310/027; G09G 2330/028; G09G 2320/0276; G09G 2310/0297; G09G 2320/0673
See application file for complete search history.

(56) References Cited

U.S. PATENT DOCUMENTS

2004/0233182 A1* 11/2004 Chuang ..... G09G 3/3696 345/204
2007/0182683 A1* 8/2007 Chin ..... G09G 3/3688 345/88
2008/0001901 A1* 1/2008 Lee ..... G09G 3/3688 345/100

(Continued)

FOREIGN PATENT DOCUMENTS

CN 106710560 A * 5/2017 ..... G09G 3/3611

*Primary Examiner* — Christina Y. Leung
(74) *Attorney, Agent, or Firm* — JCIPRNET

(57) ABSTRACT

A display driver that includes a first driver integrated circuit being cascaded to a second driver integrated circuit is introduced. The first driver integrated circuit includes a first gamma voltage generator that is configured to output a plurality of first gamma voltages to output terminals of the first gamma voltage generator. The second driver integrated circuit includes a second gamma voltage generator that is configured to output a plurality of second gamma voltages to output terminals of the second gamma voltage generator. Each of the output terminals of the first gamma voltage generator is corresponded to one of the output terminals of the second gamma voltage generator. At least one of the output terminals of the first gamma voltage generator is electrically coupled to the corresponding one of the output terminals of the second gamma voltage generator to output at least one common gamma voltage of the first gamma voltages and the second gamma voltages. A method adapted to the display driver is also introduced.

26 Claims, 9 Drawing Sheets

(56) References Cited

U.S. PATENT DOCUMENTS

| | | | | |
|---|---|---|---|---|
| 2010/0321370 | A1* | 12/2010 | Weng | G09G 3/3696<br>345/212 |
| 2015/0170609 | A1* | 6/2015 | Jung | G09G 3/20<br>345/212 |
| 2017/0162108 | A1* | 6/2017 | Jo | G09G 3/3275 |

* cited by examiner

210

DISPLAY DRIVER AND DISPLAYING METHOD FOR CASCADE APPLICATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a Reissue Application of U.S. Pat. No. 10,872,550 issued on Dec. 22, 2020. The entirety of the above-mentioned patent is hereby incorporated by reference herein and made a part of this specification.*

BACKGROUND

Technical Field

The disclosure generally relates to data display, and more particularly relates to a display driver and a displaying method that are capable of improving display quality for a cascade application.

Description of Related Art

In a cascade application, two or more driver integrated circuits (ICs) may be used to drive a same display panel. However, because of the non-ideal manufacturing and designing processes, the driving voltages generated by two or more driver ICs for displaying same display data may be different, resulting in non-uniformity (such as two-band phenomenon) in the display panel.

As demand for better display quality has grown recently, there has grown a need for more creative method and design to improve the display quality of display devices, specifically for cascade applications.

Nothing herein should be construed as an admission of knowledge in the prior art of any portion of the present disclosure.

SUMMARY

A display driver and a method thereof that are capable of improving the display quality in a cascade application are introduced herein.

The display driver includes a first driver integrated circuit and a second driver integrated circuit. The first driver integrated circuit includes a first gamma voltage generator that is configured to output a plurality of first gamma voltages to output terminals of the first gamma voltage generator. The second driver integrated circuit comprises a second gamma voltage generator that is configured to output a plurality of second gamma voltages to output terminals of the second voltage generator. Each of the output terminals of the first gamma voltage generator is corresponded to one of the output terminals of the gamma voltage generator. The first driver integrated circuit is cascaded to the second driver integrated circuit, and at least one of the output terminals of the first gamma voltage generator is electrically coupled to the corresponding one of the output terminals of the second gamma voltage generator to output at least one common gamma voltage of the first gamma voltages and the second gamma voltages.

The method that is adapted to a display driver having a first driver integrated circuit being cascaded to a second driver integrated circuit is introduced, where the first driver integrated circuit has a first gamma voltage generator and the second driver integrated circuit has a second gamma voltage generator. The method includes steps of selecting m output terminals among n output terminals of the first gamma voltage generator to be electrically coupled to m corresponding output terminals among n output terminals of the second gamma voltage generator; generating m common gamma voltages, wherein each of the m common gamma voltages is generated by either the first gamma voltage generator or the second gamma voltage generator; and providing the m common gamma voltages to the first driver integrated circuit and the second driver integrated circuit.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
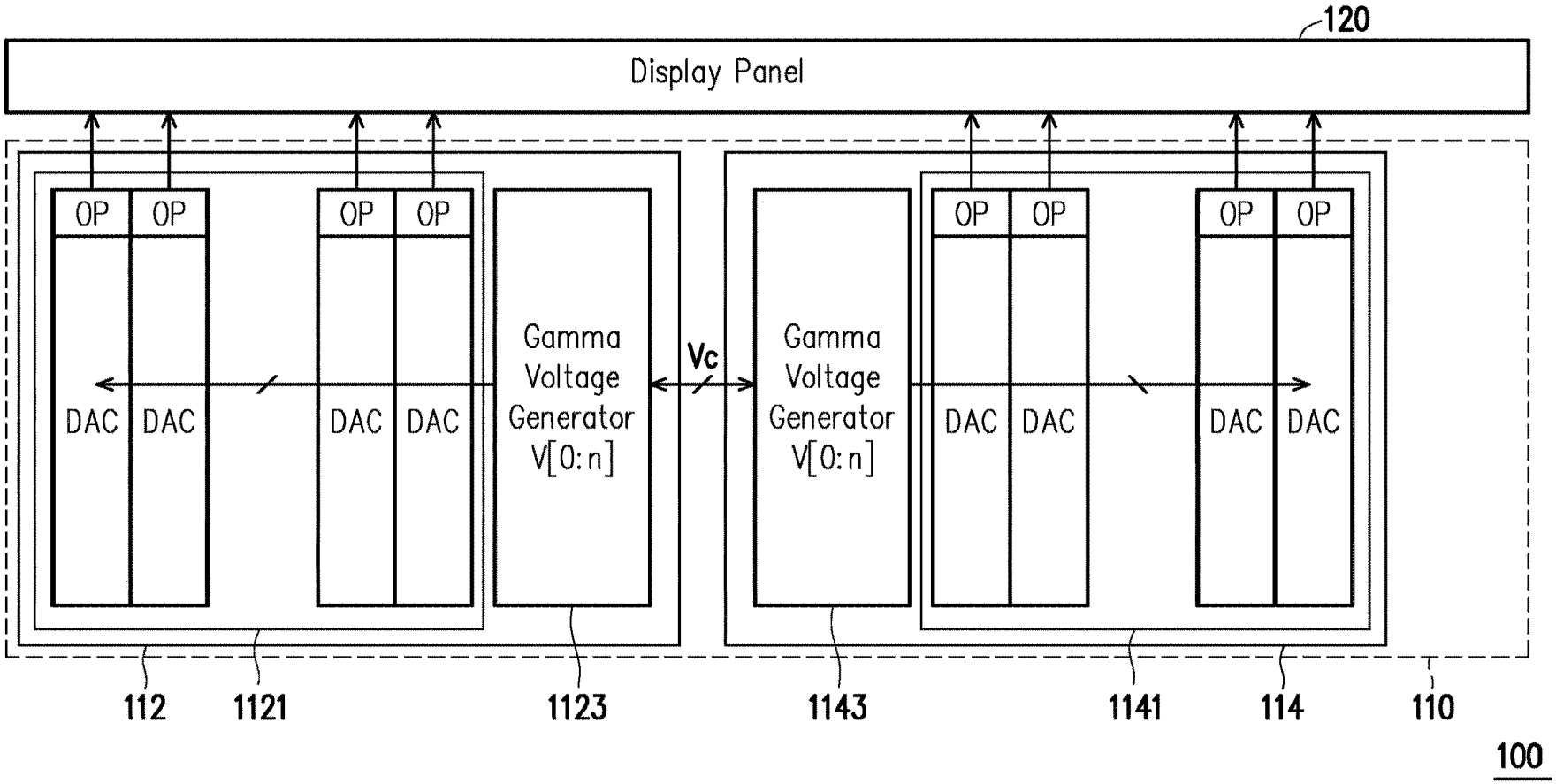
FIG. 1 illustrates a schematic diagram of a display system according to an embodiment of the disclosure.

Referring to FIG. 1, a display system 100 includes a display driver 110 and a display panel 120, in which the display driver 110 is configured to drive the display panel 120. In some embodiments of the disclosure, the display panel 120 may be a liquid crystal display (LCD) panel or an organic light emitting diode (OLED) panel, but the display panel 120 is not limited to any specific type of display panel.

The display driver 110 may include driver integrated circuits (ICs) 112 and 114 being cascaded to each other, where the driver ICs 112 and 114 are configured to drive the display panel 120. The driver IC 112 includes a gamma voltage generator 1123 and a source drive circuit 1121, in which the gamma voltage generators 1123 is configured to generate a plurality of gamma voltages V[0] to V[n] (also known as first gamma voltages), n is a natural number. The first gamma voltages V[0] to V[n] are supplied to the source drive circuit 1121 through the output terminals of the gamma voltage generator 1123. The source drive circuit 1121 is coupled to output terminals of the gamma voltage generator 1123 to receive the gamma voltages V[0] to V[n] from the gamma voltage generator 1123. The source drive circuit 1121 is configured to drive the display panel 120 according to the first gamma voltages V[0] to V[n].

The driver IC 114 includes a gamma voltage generator 1143 and a source drive circuit 1141, in which the gamma voltage generators 1143 is configured to generate a plurality of gamma voltages V[0] to V[n] (also known as second gamma voltages). The second gamma voltages V[0] to V[n] are supplied to the source drive circuit 1141 through the output terminals of the gamma voltage generator 1143. The source drive circuit 1141 is coupled to output terminals of the gamma voltage generator 1143 to receive the gamma voltages V[0] to V[n] from the gamma voltage generator 1143. The source drive circuit 1141 is configured to drive the display panel 120 according to the second gamma voltages V[0] to V[n]. In the embodiment shown in FIG. 2, two driver ICs 112 and 114 are illustrated. However, the disclosure is not limited thereto and the number of cascaded driver ICs could be more than two. In other words, the display driver 110 includes at least two driver ICs.

In some embodiments of the disclosure, each of the output terminals of the gamma voltage generator 1123 corresponds to one of the output terminal of the gamma voltage generator 1143; and at least one output terminal of the gamma voltage generator 1123 is electrically coupled to the corresponding one of the gamma voltage generator 1143 to form common output terminals of the gamma voltage generators 1123 and 1143. The common output terminals output common gamma voltages Vc which is provided to both of the source drive circuit 1121 of the driver IC 112 and the source drive circuit 1141 of the driver IC 114. A number of the common output terminals of the gamma voltage generators 1123 and 1143 is determined according to design needs, and the disclosure is not limited to any specific number of the common output terminals of the gamma voltage generators 1123 and 1143.

Each of the source drive circuits 1121 and 1141 includes a plurality of digital-to-analog converters DACs and a plurality of operational amplifiers OPs, where each of the DACs is electrically coupled to one of the OPs. The source drive circuits 1121 and 1141 are configured to drive the display panel 120 according to the common gamma voltages and non-common gamma voltages outputted by the gamma voltage generators 1123 and 1143.

Figure 2:
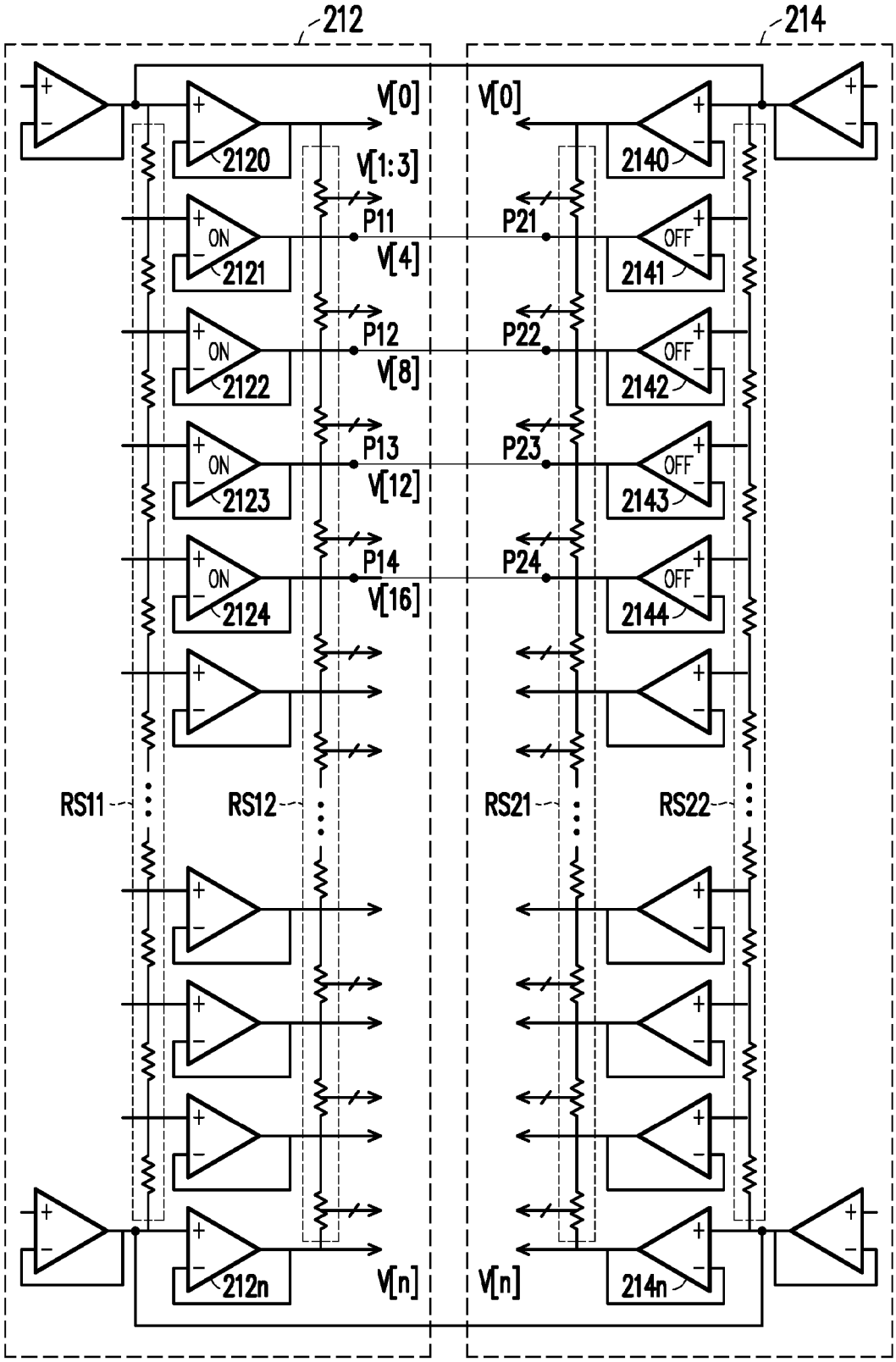
FIG. 2, FIG. 3A, FIG. 3B, FIG. 4A, FIG. 4B, FIG. 5 and FIG. 6 illustrate schematic diagrams of display drivers according to some embodiments of the disclosure.

Referring to FIG. 2, a display driver 210 according to an embodiment of the disclosure is illustrated. The display driver 210 includes a driver IC 212 and a driver IC 214, where the driver IC 212 is cascaded to the driver IC 214 and both of the driver ICs 212 and 214 are configured to drive a display panel (not shown). The driver IC 212 includes a plurality of buffers 2120 to 212n, and resistor strings RS11 and RS12. The resistor string RS11 includes a plurality of resistors coupled in series. Each of the buffers 2120 to 212n is configured to output one of the gamma voltages. For examples, the buffers 2120, 2121, 2122, 2123 and 2124 outputs the gamma voltages V[0], [V4], V[8], V[12] and V[16], respectively.

The resistor string RS12 includes a plurality of resistors coupled in series, wherein the first resistor of the resistor string RS12 is coupled to the output terminal of the buffer 2120, and the last resistor of the resistor string RS12 is coupled to the output terminal of the buffer 212n. The resistor strings RS12 has a plurality of output nodes that outputs gamma voltages among the gamma voltages V[0] to V[n]. For example, the resistor string RS12 generates the gamma voltages V[1:3], V[5:7], V[9:11], and so on. In some embodiments of the disclosure, the resistor string RS12 may be considered as the voltage divider circuits that are configured to generate voltages with different voltage levels.

The driver IC 214 includes a plurality of buffers 2140 to 214n, and resistor strings RS21 and RS22. The buffers 2140 to 214n and resistor strings RS21 and RS22 of the driver IC 214 are similar to the buffers 2120 to 212n and the resistors strings RS11 and RS12 of the driver IC 212, respectively. Thus, the detailed description about the buffers 2140 to 214n and resistor strings RS21 and RS22 are omitted hereinafter.

In FIG. 2, the output terminals of the buffers 2121 to 2124 of the driver IC 212 are electrically coupled to the output terminals of the buffer 2141 to 2144 of the driver IC 214, respectively, to form common output terminals of the driver IC 212 and the driver IC 214. In other words, the nodes P11, P12, P13 and P14 of the driver IC 212 is electrically coupled to the nodes P21, P22, P23 and P24 of the driver IC 214, respectively. The common output terminals are configured to output common gamma voltages. In the embodiment shown in FIG. 2, the gamma voltages V[4], V[8], V[12] and V[16] are common gamma voltages of the driver IC 212 and the driver IC 214.

In some embodiments of the disclosure, the buffers that are coupled to one common output terminal are operated in opposite states (e.g., ON and OFF states). As an example, the buffers 2121 and 2141 are coupled to the common output terminal, and only one of the buffers 2121 and 2141 is turned on at a time to generate the common gamma voltage V[4]. In other words, the common gamma voltage V[4] is generated by either the buffer 2121 of the driver IC 212 or the corresponding buffer 2141 of the driver IC 214. Similarly, only one of the buffers 2122 and 2142 is turned on at a time to generate the common gamma voltage V[8]; only one of the buffers 2123 and 2143 is turned on at a time to generate the common gamma voltage V[12]; and only one of the buffers 2124 and 2144 is turned on at a time to generate the common gamma voltage V[16].

Figure 3A:
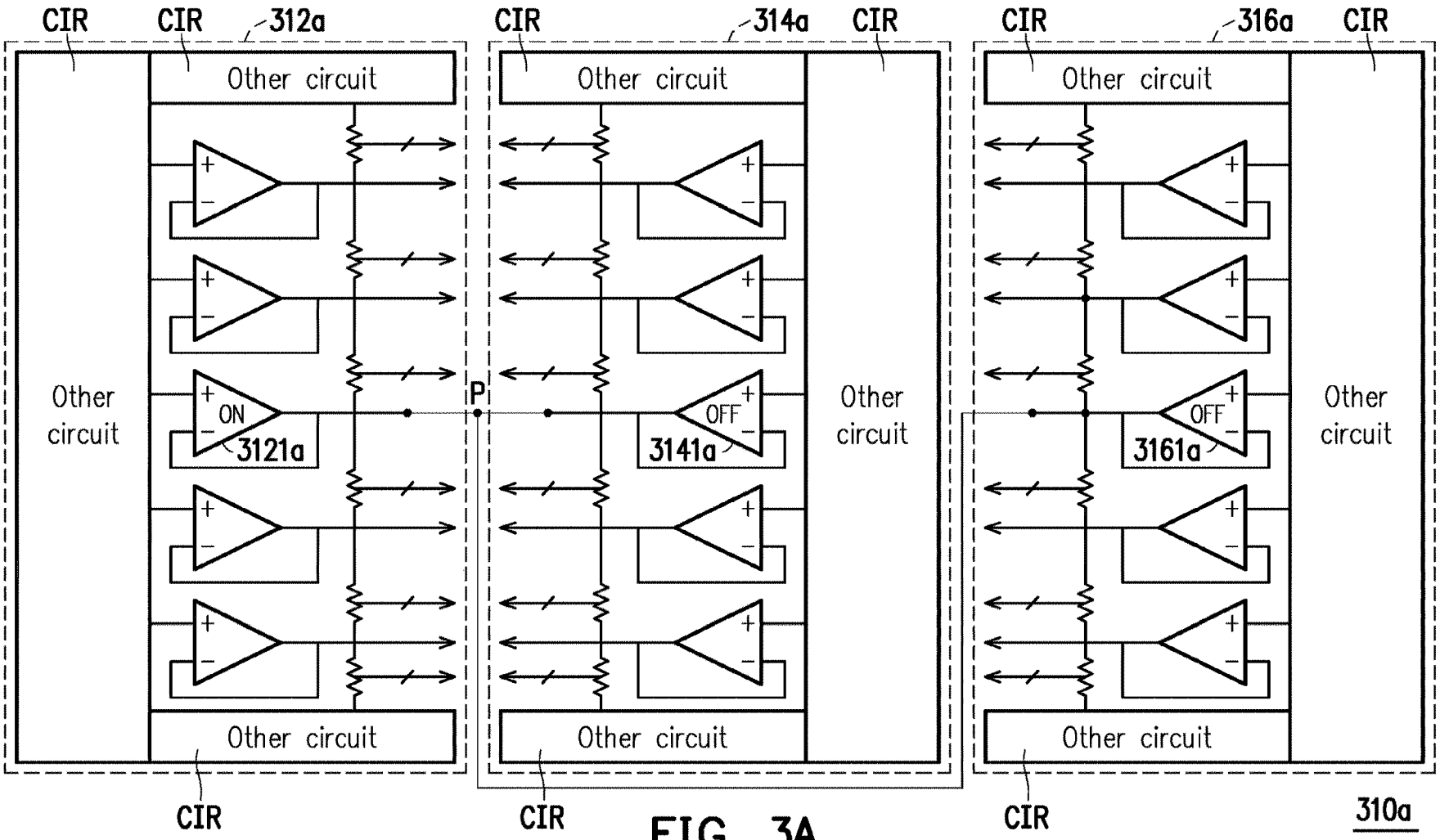

Referring to FIG. 3A, a display driver 310a according to an embodiment of the disclosure is illustrated. The display driver 310a includes drive ICs 312a, 314a and 316a being cascaded to each other. Each of the driver ICs 312a, 314a and 316a includes a plurality of buffers and a resistor string, where the buffers are similar to the buffer 2120 to 212n of the driver IC 212 in FIG. 2, and the resistor string is similar to the resistor string RS12 of the driver IC 212 in FIG. 2. As such, the detailed description about the buffers and the resistor string of each of the driver ICs 312a, 314a and 316a are omitted hereafter.

The driver ICs 312a, 314a and 316a include buffers 3121a, 3141a and 3161a, respectively, where the buffer 3121a of the driver IC 312a corresponds to the buffer 3141a of the driver IC 314a and the buffer 3161a of the driver IC 316a. The output terminals of the buffers 3121a, 3141a and 3161a are all coupled a common node P. A common gamma voltage is generated and outputted to the common node P by one of the buffers 3121a, 3141a and 3161a. For example, if the buffer 3121a is turned on to generate the common gamma voltage at the common node P, the other buffers 3141a and 3161a are turned off. In other words, only one of the buffers 3121a, 3141a and 3161a is turned on at a time to generate the common gamma voltage at the common node P.

Figure 3B:
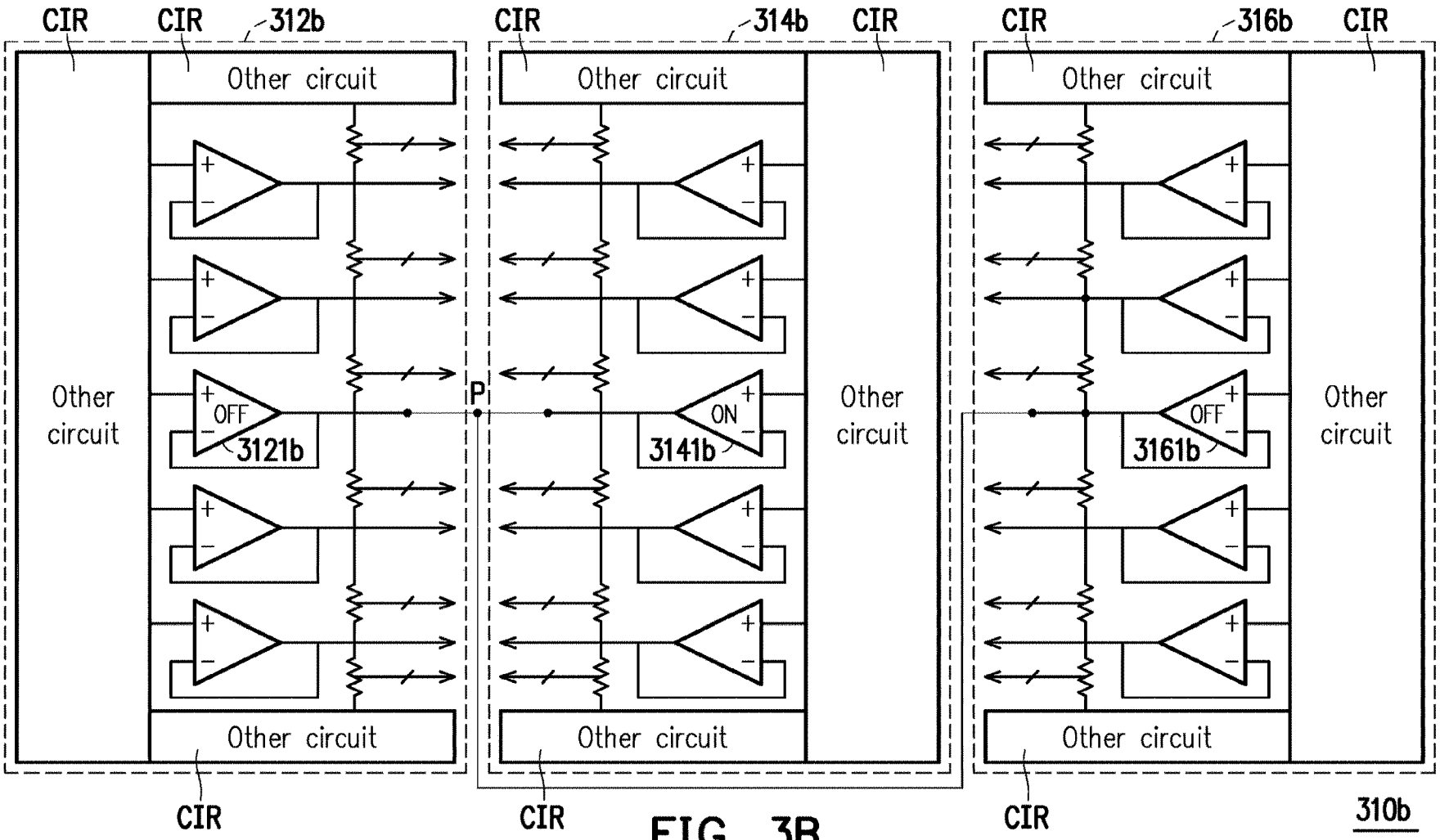

Referring to FIG. 3B, a display driver 310b that includes driver ICs 312b, 314b and 316b according to an embodiment of the disclosure is illustrated. The driver ICs 312b, 314b and 316b in FIG. 3B are similar to the driver ICs 312a, 314a and 316a in FIG. 3A, thus the detailed description about the driver ICs 312b, 314b and 316b is omitted hereafter.

A difference between the display driver 310b in FIG. 3B and the display driver 310a in FIG. 3A is the state of the buffers. In FIG. 3A, the buffer 3121a in the driver IC 312 is turned on while the other two corresponding buffers 3141a and 3161a in the driver ICs 314 and 316 are turned off at a time to generate the common gamma voltage at the common node P. In FIG. 3B, the buffer 3141b is turned on while the other two corresponding buffers 3121b and 3161b of the driver ICs 312 and 316 are turned off at a time to generate the common gamma voltage at the common node P. In other words, only one of the buffers 3121b, 3141b and 3161b that are coupled to the common node P is turned on at a time to generate the common gamma voltage.

Figure 4A:
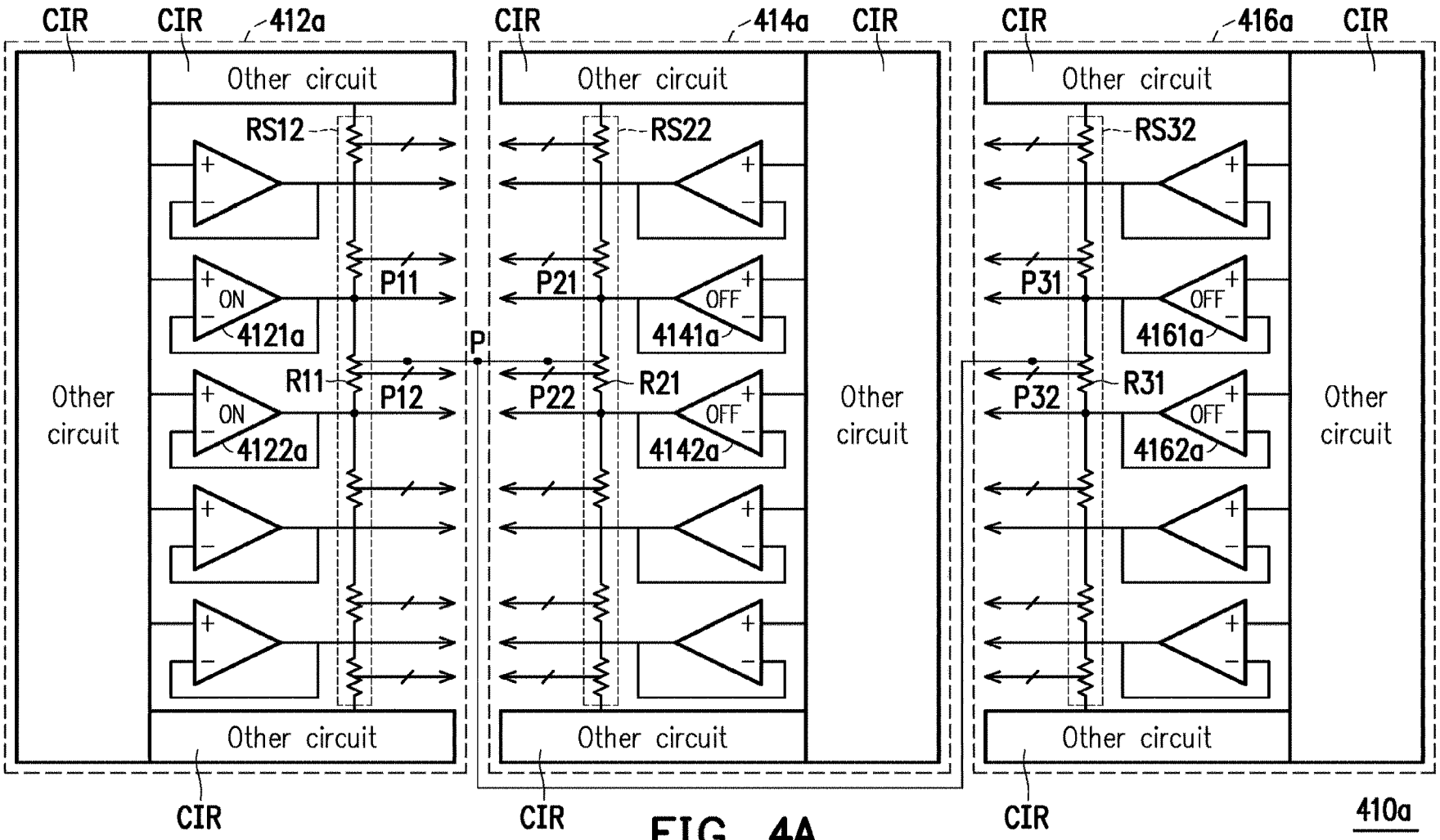

Referring to FIG. 4A, a display driver 410a that includes driver ICs 412a, 414a and 416a is illustrated. The driver IC 412a includes a resistor Ru coupled between output terminals of buffers 4121a and 4122a through nodes P11 and P12; the driver IC 414a includes a resistor R21 coupled between output terminals of buffers 4141a and 4142a through nodes P21 and P22; and the driver IC 416a includes a resistor R31 coupled between output terminals of buffers 4161a and 4162a through nodes P31 and P32. The resistor R11 of the resistor string RS12 corresponds to the resistor R21 of the resistor string RS22 and the resistor R31 of the resistor string RS32.

Each of resistor strings RS12, RS22 and RS32 of the driver ICs 412a, 414a and 416a, respectively has a plurality of output nodes to output gamma voltages. The output node corresponding to the resistor R11 of the resistor string RS12 is electrically coupled to the output node corresponding to the resistor R21 of the resistor string RS22 and the output node that corresponds to the resistor R31 of the resistor string RS32. In other words, there is a common output node P that is electrically coupled to the output nodes corresponding to the resistors R11, R21 and R31.

In FIG. 4A, the buffer 4121a of the driver IC 412a corresponds to the buffer 4141a of the driver IC 414a and the buffer 4161a of the driver IC 416a; and the buffer 4122a of the driver IC 412a corresponds to the buffer 4142a of the driver IC 414a and the buffer 4162a of the driver IC 416a. During an operation, only one of the buffers 4121a, 4141a and 4161a are turned on at a time; and only one of the buffer 4122a, 4142a and 4162a are turned on at the same time. As shown in FIG. 4, only the buffer 4121a is turned on while the corresponding buffers 4141a and 4161a are turned off. Similarly, only the buffer 4122a is turned on while the corresponding buffers 4142a and 4162a are turned off. In this way, the common gamma voltage is generated at the common output node P, and this common gamma voltage is provided to source drive circuits (not shown) of all driver ICs 412a, 414a and 416a to drive the display panel (not shown).

Figure 4B:
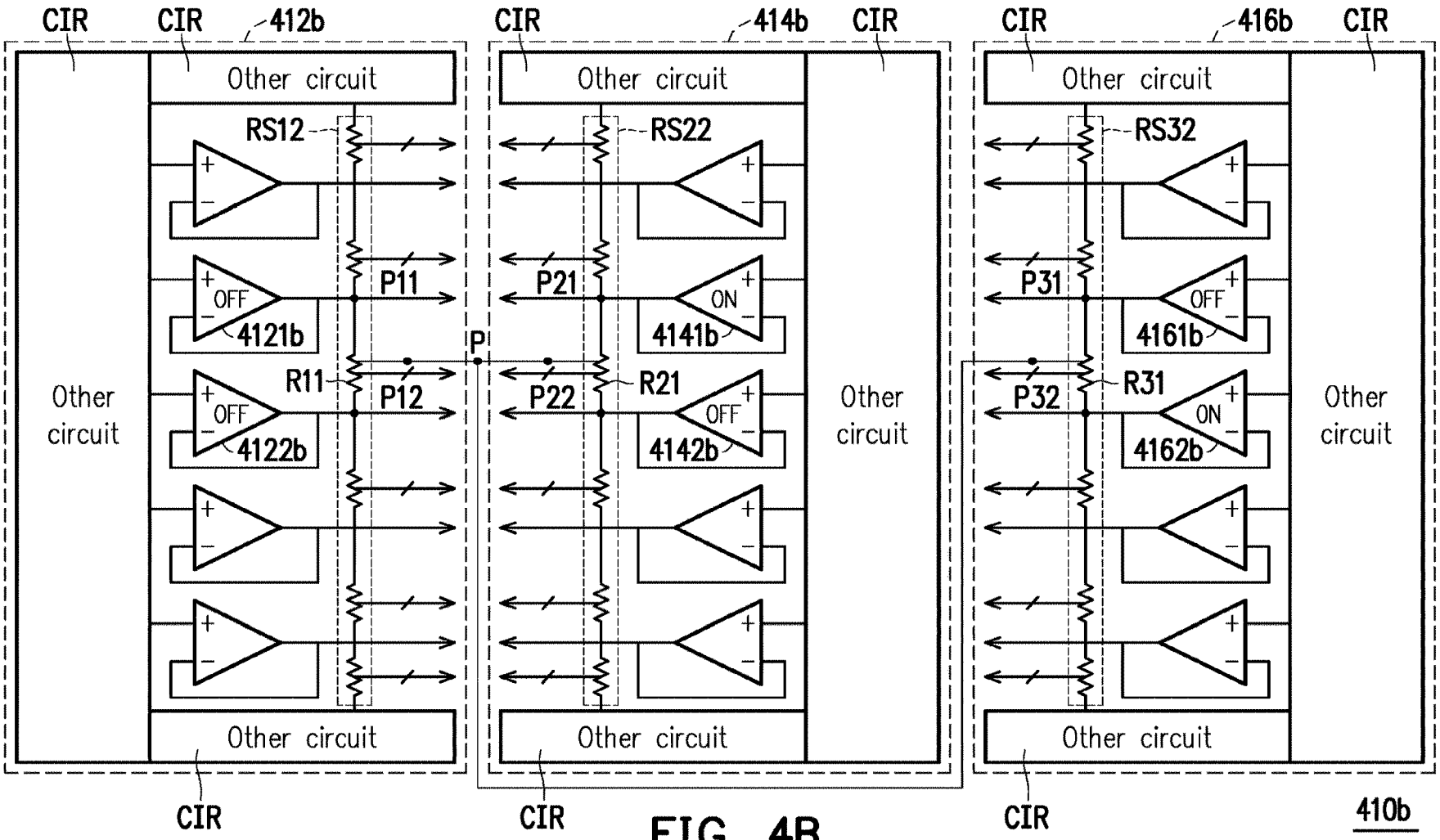

Referring to FIG. 4B, a display driver 410b that includes driver ICs 412b, 4146 and 416b according to an embodiment of the disclosure is illustrated. The driver ICs 412b, 414b and 416b in FIG. 4B are similar to the driver ICs 412a, 414a and 416a in FIG. 4A, thus the detailed description about the driver ICs 412b, 414b and 416b is omitted hereafter.

A difference between the display driver 410b in FIG. 4B and the display driver 410a in FIG. 4A is the state of the buffers. In FIG. 4A, the buffer 4121a and 4122a of the driver IC 412a are turned on while the other corresponding buffers 4141a, 4161a, 4142a and 4162a are turned off at a time to generate the common gamma voltage at the common node P. In FIG. 4B, the buffer 4141b of the driver IC 414b is turned on while the corresponding buffers 4121b and 4161b of the driver ICs 412b and 416b are turned off. Meanwhile, the buffer 4162b of the driver IC 416b is turned on while the corresponding buffers 4122b and 4142b of the driver ICs 412b and 414b are turned off.

Figure 5:
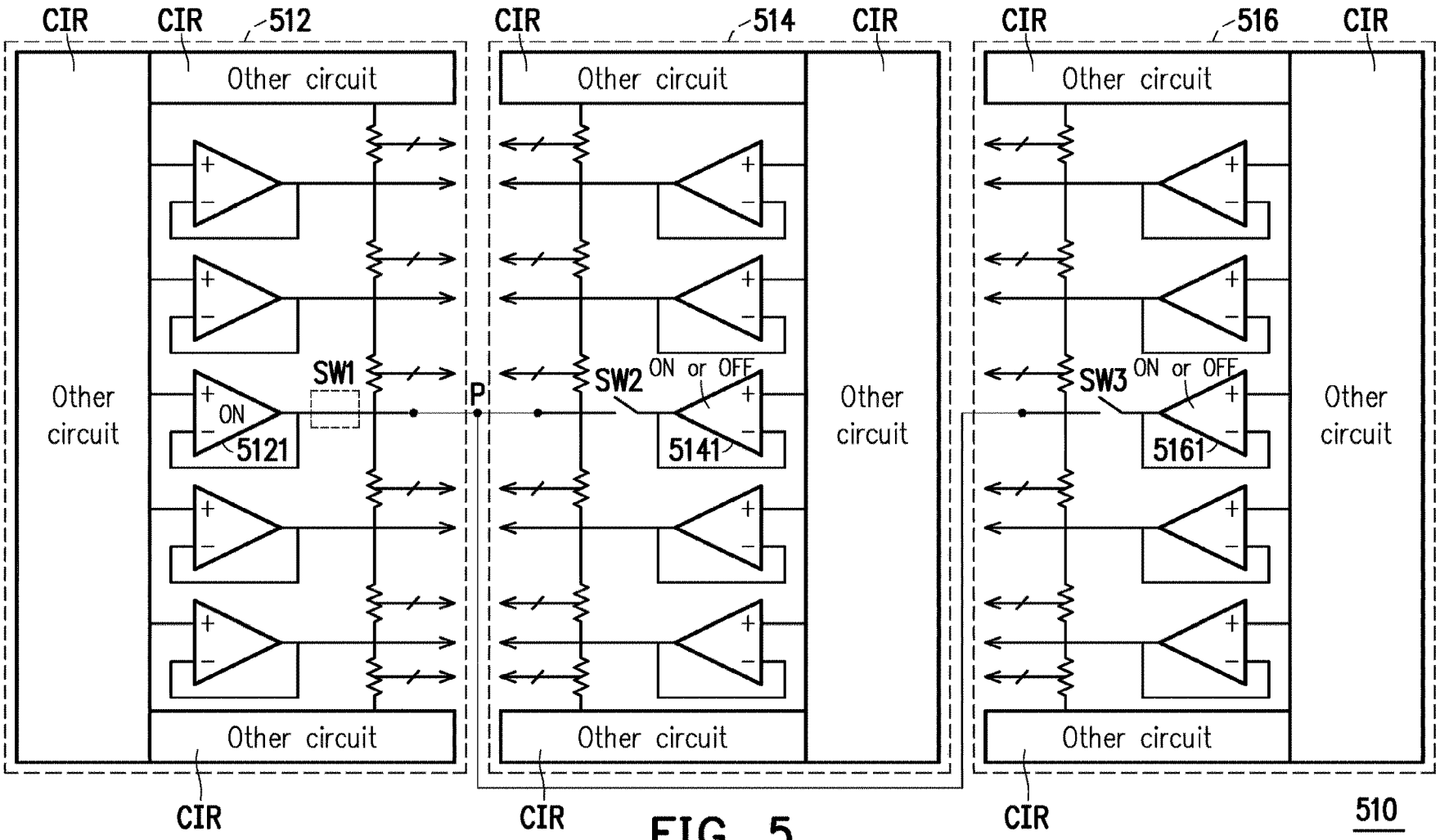

Referring to FIG. 5, a display driver 510 that includes driver ICs 512, 514 and 516 according to an embodiment of the disclosure is illustrated. Each of the driver ICs 512, 514 and 516 includes a plurality of buffers and a resistor string that are similar to the buffers and resistor strings shown in FIG. 3A, thus the detailed description about the buffers and the resistor strings of the driver ICs 512, 514 and 516 is omitted hereafter.

The driver ICs 512, 514 and 516 include the buffers 5121, 5141 and 5161, respectively, where the buffer 5121 of the driver IC 512 corresponds to the buffer 5141 of the driver IC 514 and the buffer 5161 of the driver IC 516. The driver ICs 512, 514 and 516 further include switches SW1, SW2 and SW3, wherein the switch SW1 is coupled between the output terminal of the buffer 5121 and a common node P, the switch SW2 is coupled between the output terminal of the buffer 5141 and the common node P, and the switch SW3 is coupled between the output terminal of the buffer 5161 and the common node P. The switches SW1, SW2, SW3 are configured to electrically connect or electrically isolate the common node P from the buffers 5121, 5141 and 5161, respectively.

During an operation, the switches SW1, SW2 and SW3 are controlled such that only one of the buffer 5121, 5141 and 5161 is configured to generate a common gamma voltage at the common node P. For example, the switches SW1, SW2 and SW3 are controlled to electrically coupled the output terminal of the buffer 5121 to the common node P and isolate the output terminals of the buffers 5141 and 5161 from the common node P. Meanwhile, the buffer 5121 of the driver IC 512 is turned on to generate the common gamma voltage at the common node P. In this way, regardless of the states of the buffers 5141 and 5161 (e.g., ON state or OFF state), only the gamma voltage generated by the buffer 5121 of the driver IC 512 is provided to the common node P.

Figure 6:
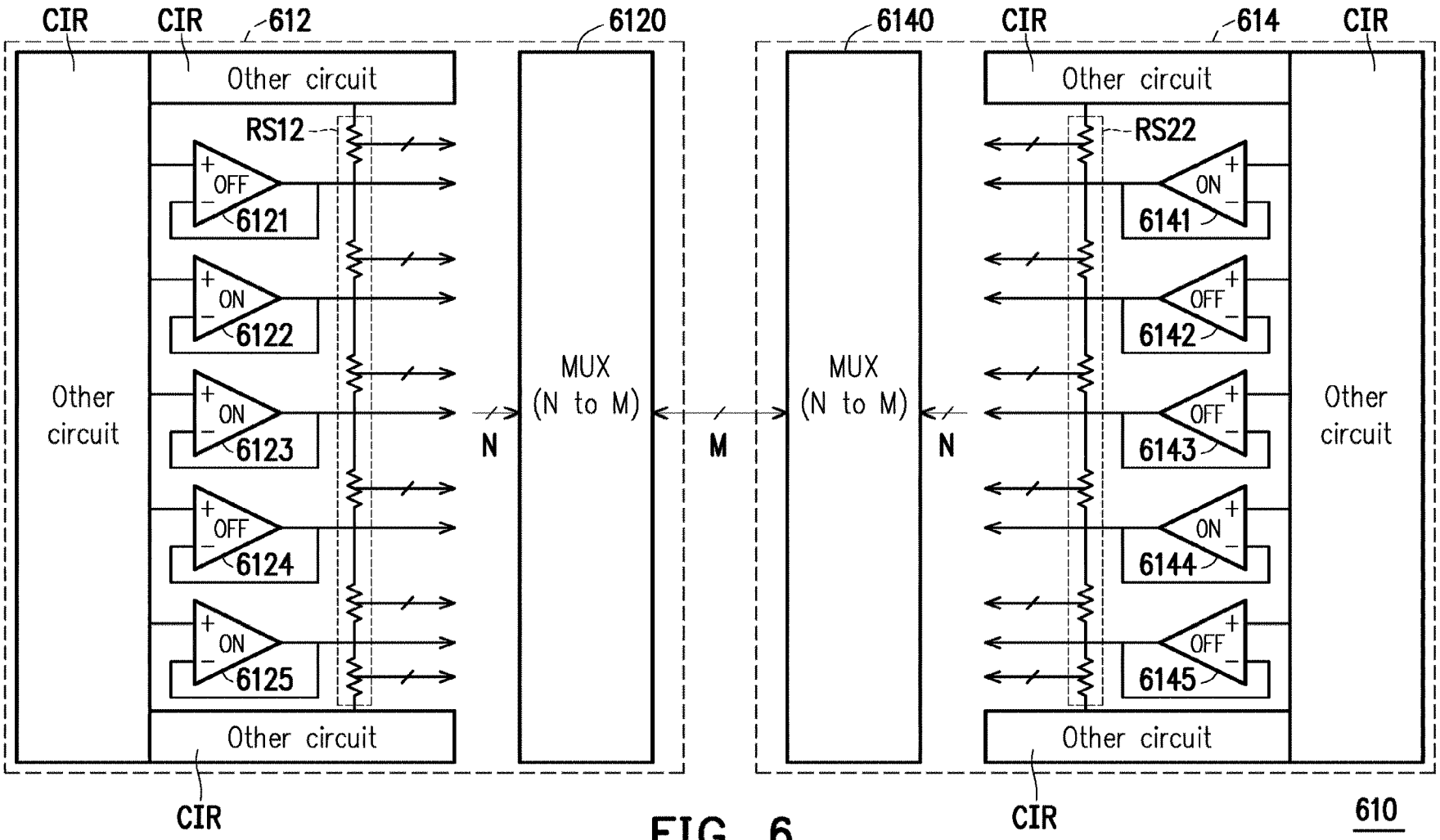

Referring to FIG. 6, a display driver 610 that includes driver ICs 612 and 614 according to an embodiment of the disclosure is illustrated. Each of the driver ICs 612 and 614 includes a plurality of buffers and a resistor string for generating a plurality of gamma voltages. Particular, the driver IC 612 includes buffers 6121 to 6125 and a resistor string RS11; and the driver IC 614 includes buffers 6141 to 6145 and the resistor string RS22. The buffers and the resistor string of the driver ICs 612 and 614 in FIG. 6 are similar to the buffers and the resistor string in FIG. 2, thus the detailed description about the buffers and the resistor string of the driver ICs 612 and 614 is omitted hereafter.

The driver IC 612 further includes a multiplexer 6120 which is coupled to the output terminals of the resistor string RS12 and the output terminals of the buffers 6121 to 6125; and the driver IC 614 further includes a multiplexer 6140 which is coupled to the output terminals of the resistor string RS22 and the output terminals of the buffers 6141 to 6145. In some embodiments, the multiplexers 6120 and 6140 may be n-to-m multiplexers that are configured to select M out of N input signals, where N and M are natural number, and M is smaller than N. The multiplexers 6120 may select M out of N output nodes of the buffers 6121 to 6125 and the resistor string RS12. The multiplexer 6140 may select M out of N output nodes of the of the buffers 6141 to 6145 and the resistor string RS22, wherein the M output nodes selected by the multiplexer 6140 are corresponded to the M output nodes selected by the multiplexer 6120.

The M output nodes selected by the multiplexer 6140 is electrically coupled to the corresponding M output nodes selected by the multiplexer 6120 to form M common output nodes, where M output nodes output M common gamma voltages for the driver ICs 612 and 614. The buffers of the driver IC 612 and the corresponding buffers of the driver IC 614 that are related to the selected M output nodes are controlled such that only one of the buffer from the driver IC 612 and the corresponding one of the driver IC 614 are turned on at a time. For example, when the multiplexer 6120 and 6140 select to connect the output nodes of the buffers 6121 to 6125 of the driver IC 612 to the corresponding output nodes of buffers 6141 to 6145 of the driver IC 614, only one of the buffers 6121 and 6141 are turned on at a time, only one of the buffer 6122 and 6142 are turned on at a time, and so on.

In an alternative embodiment, when the multiplexers 6120 and 6140 select to connect an output node of the resistor string RS12 of the driver IC 612 to the corresponding output node of the resistor string RS22 of the driver IC 614, the buffers related to the output node of the resistor string RS12 and the corresponding buffers related to the corresponding output node of the resistor string RS22 are controlled such that only one of the buffer from the driver IC 612 and the corresponding one of the driver IC 614 are turned on at a time. For example, when the multiplexers 6120 and 6140 select to connect an output node of the resistor located between the buffer 6121 and 6122 of the resistor string RS12 to the output node of the resistor located between the buffer 6141 and 6142 of the resistor string RS22, the buffers 6121 and 6122 of the driver IC 612 and the corresponding buffers 6141 and 6142 of the driver IC 614 are controlled such that only one of the buffer 6121 and the corresponding buffer 6141 is turned on at a time, and only one of the buffer 6122 and the corresponding buffer 6142 is turned on at a time.

In FIG. 3A to FIG. 6, the display driver further includes other circuits CIR that are configured to cooperate with the buffers and resistor string of each of the driver ICs to generate the gamma voltages and to drive the display panel. One of skilled in the arts would be clear about the structure and operation of the other circuits CIR as shown in FIG. 3A to FIG. 6, thus the detailed description about the other circuits CIR of FIG. 3A to FIG. 6 is omitted hereafter.

Figure 7:
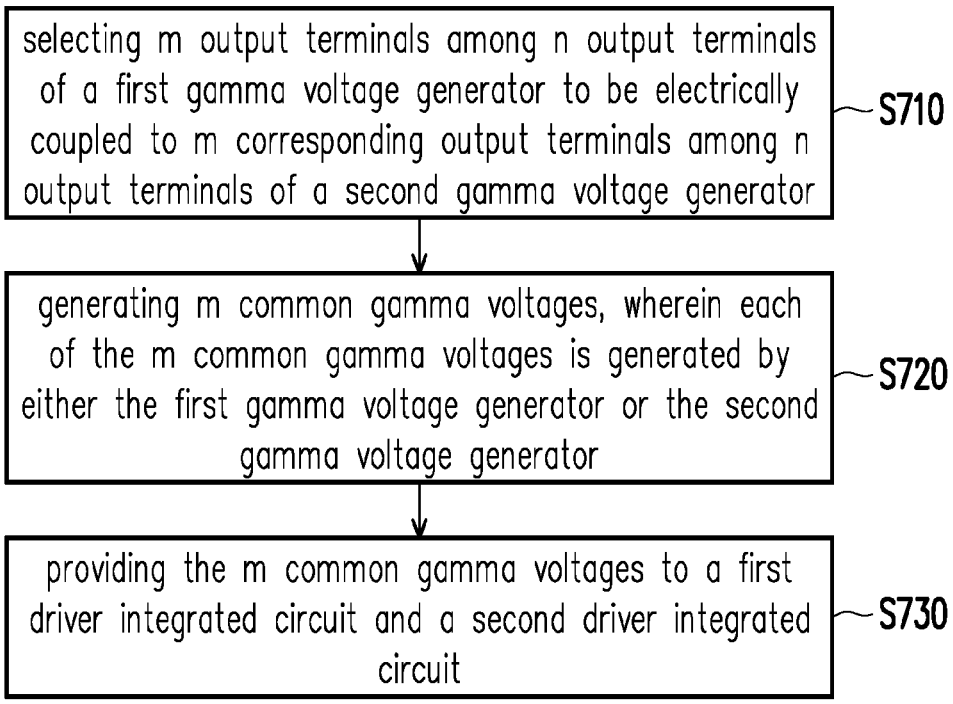
FIG. 7 illustrates a flowchart diagram of a method adapted to a display driver according to an embodiment of the disclosure.

Referring to FIG. 7, a flowchart of a method adapted to a display driver having a first driver integrated circuit being cascaded to a second driver integrated circuit is illustrated, wherein the first driver integrated circuit comprising a first gamma voltage generator and the second driver integrated circuit comprising a second gamma voltage generator. In step S710, m output terminals among n output terminals of the first gamma voltage generator are selected to be electrically coupled to m corresponding output terminals among n output terminals of the second gamma voltage generator. In step S720, m common gamma voltages are generated, wherein each of the m common gamma voltages is generated by either the first gamma voltage generator or the second gamma voltage generator. In step S730, the m common gamma voltages are provided to the first driver integrated circuit and the second driver integrated circuit.

From the above embodiments, at least one common output nodes (output terminals) of gamma voltage generators in different driver ICs are formed to generate at least one common gamma voltage, where each of the at least one common gamma voltage is generated by only one of the gamma voltage generators. The common gamma voltage will be provided to source drive circuits of different driver ICs so as to drive a display panel. In this way, the display uniformity is achieved and the display quality is improved for a cascade application.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display driver, comprising:

a first driver integrated circuit, comprising a first gamma voltage generator configured to output [a plurality of] *n* first gamma voltages to *n* output terminals of the first gamma voltage generator, a second driver integrated circuit, comprising a second gamma voltage generator configured to output [a plurality of] *n* second gamma voltages to *n* output terminals of the second gamma voltage generator, wherein each of the *n* output terminals of the first gamma voltage generator is corresponded to one of the *n* output terminals of the second gamma voltage generator, wherein [the first driver integrated circuit cascaded to the second driver integrated circuit, at least one of] *m output terminals among* the *n* output terminals of the first gamma voltage generator is electrically coupled to the corresponding [one of] *m output terminals among* the *n* output terminals of the second gamma voltage generator to form [a] *m* common output [terminal] *terminals*, and [at least one] *m* common gamma [voltage of] *voltages that are selected from* the *n* first gamma voltages and the *n* second gamma voltages [is] *are* outputted to the *m* common output [terminal] *terminals, wherein n and m are natural numbers, and n is greater than m*.

2. The display driver of claim 1, wherein the first driver integrated circuit further comprises a first source driver circuit being coupled to the first gamma voltage generator, the first source driver circuit is configured to drive a display panel according to the [at least one] *m* common gamma [voltage] *voltages*, the second driver integrated circuit further comprises a second source driver circuit being coupled to the second gamma voltage generator, the second source driver circuit is configured to drive the display panel according the [at least one] *m* common gamma [voltage] *voltages*.

3. The display driver of claim 2, wherein the [at least one] *m* common gamma [voltage comprises] *voltages comprise* a first common gamma voltage, the first common gamma voltage is generated by either the first gamma voltage generator or the second gamma voltage generator, and the first common gamma voltage is outputted to both of the first source [drive] *driver* circuit and the second source [drive] *driver* circuit.

4. The display driver of claim 3, wherein the first gamma voltage generator comprises:

a plurality of first buffers, each of the first buffers is configured to generate one of the first gamma voltages, and a first resistor string, configured to generate at least one of the first gamma voltages, and the second gamma voltage generator comprises:

a plurality of second buffers, each of the second buffers is configured to generate one of the second gamma voltages; and a second resistor string, configured to generate at least one of the second gamma voltages.

5. The display driver of claim 4, wherein each of the first buffers is corresponded to one of the second buffers, the first common gamma voltage is generated by either one of the first buffers or the corresponding one of the second buffers, wherein the one of the first buffers is electrically connected to the corresponding one of the second buffers.

6. The display driver of claim 5, wherein only one of the one of the first buffers and the corresponding one of the second buffers is turned on at a time.

7. The display driver of claim 5, wherein the first gamma *voltage* generator further comprises a first switch coupled between an output terminal of the one of the first buffers and the output terminal of the first gamma *voltage* generator, the second gamma *voltage* generator further comprises a second switch coupled between an output terminal of the corresponding one of the second buffers and the output terminal of the second gamma *voltage* generator, and only one of the first switch and the second switch is turned on at a time.

8. The display driver of claim 4, wherein each node in the first resistor string is corresponded to a node in the second resistor string, the first common gamma voltage is generated by either one node of the first resistor string or the corresponding node of the second resistor string, wherein the one node of the first resistor string is electrically connected to the corresponding node of the second resistor string.

9. The display driver of claim 4, wherein

*the first gamma voltage generator comprises a first multiplexer connected to the m common output terminals,*

*the second gamma voltage generator comprises a second multiplexer connected to the m common output terminals,*

[each of the first gamma voltage generator and the second gamma voltage generator comprise a multiplexer] *the first multiplexer and the second multiplexer are* configured to select *the* m common gamma voltages among *the* n *first* gamma voltages *and the n second gamma voltages*, [wherein n and m are natural numbers, and n is greater than m,] and each of the m common gamma voltages is generated by either the first gamma voltage generator or the second gamma voltage generator.

10. The display driver of claim 9, wherein

*the* m output terminals of the first gamma voltage generator are selected to be coupled to *the* m corresponding output terminals of the second gamma voltage generator through m connection lines, *the m connection lines are connected to the m common output terminals*, and the first buffers that are [related] *connected* to the m connection lines and the second buffers that are [related] *connected* to the m connection lines are controlled such that [the] *a* common gamma voltage *among the m common gamma voltages* in each of the m connection lines is generated by either an output terminal of *the* first gamma voltage generator or a corresponding output terminal of the second gamma voltage generator.

11. The display driver of claim 10, wherein them connection lines include a connection line that connects one of the first buffers to a corresponding one of the second buffers, and either one of the first buffers or the corresponding one of the second buffers are turned on at a time to output a common gamma voltage in the connection line.

12. The display driver of claim 10, wherein the m connection lines include a connection line that connects a node of the first resistor string to a corresponding node of the second resistor string,

*the node of the first resistor string is located between two first buffers among the first buffers,*

*the corresponding node of the second resistor string is located between two second buffers among the second buffers, the two second buffers correspond to the two first buffers,* and the *two of the* first buffers [that are related to the node of the first resistor string and the] *and* corresponding *two* second buffers [that are related to the corresponding one of the second resistor string] are controlled such that [one of] the *two* first buffers [that are related to the node of the first resistor string] or [a corresponding one of] the *two* second buffers [that are related to the corresponding node of the second resistor string is] *are* turned on at a time.

13. A method adapted to a display driver having a first driver integrated circuit [being cascaded to] *and* a second driver integrated circuit, the first driver integrated circuit comprising a first gamma voltage generator and the second driver integrated circuit comprising a second gamma voltage generator, the method comprising:

selecting m output terminals among n output terminals of the first gamma voltage generator to be electrically coupled to m corresponding output terminals among n output terminals of the second gamma voltage generator to form m common output terminals;

generating m common gamma voltages and outputting the m common gamma voltages to the m common output terminals, wherein each of the m common gamma voltages is generated by either the first gamma voltage generator or the second gamma voltage generator;

providing the m common gamma voltages to the first driver integrated circuit and the second driver integrated circuit, *wherein n and m are natural numbers, and n is greater than m.*

14. The method of claim 13, wherein the first driver integrated circuit further comprises a first source [drive] *driver* circuit being coupled to the first gamma voltage generator, the second driver integrated circuit further comprises a second source [drive] *driver* circuit being coupled to the second gamma voltage generator, and the m common gamma voltages are provided to both of the first source [drive] *driver* circuit and the second source [drive] *driver* circuit.

*15. A display driver, comprising:*

*m common output terminals;*

*a first driving circuit, comprising a first gamma voltage generator coupled to the m common output terminals and configured to generate n first gamma voltages; and*

*a second driving circuit, comprising a second gamma voltage generator coupled to the m common output terminals and configured to generate n second gamma voltages, wherein each of the n second gamma voltages is corresponded to one of the n first gamma voltages,*

*wherein m common gamma voltages that are selected from the n first gamma voltages and the n second gamma voltages are outputted to the m common output*

*terminals, wherein n and m are natural numbers, and n is greater than m, wherein*

*the first gamma voltage generator comprises a first multiplexer connected to the m common output terminals,*

*the second gamma voltage generator comprises a second multiplexer connected to the m common output terminals,*

*the first multiplexer and the second multiplexer are configured to select the m common gamma voltages among the n first gamma voltages and the n second gamma voltages, and*

*each of the m common gamma voltages is generated by either the first gamma voltage generator or the second gamma voltage generator.*

*16. The display driver of claim 15, wherein*

*the first driving circuit further comprises a first source driver being coupled to the first gamma voltage generator, the first source driver is configured to drive a display panel according to the m common gamma voltages,*

*the second driving circuit further comprises a second source driver being coupled to the second gamma voltage generator, the second source driver is configured to drive the display panel according to the m common gamma voltages.*

*17. The display driver of claim 16, wherein*

*the m common gamma voltage comprises a first common gamma voltage,*

*the first common gamma voltage is generated by either the first gamma voltage generator or the second gamma voltage generator, and*

*the first common gamma voltage is provided to both of the first source driver and the second source driver.*

*18. A display driver, comprising:*

*m common output terminals; and*

*a plurality of gamma voltage generators, each gamma voltage generator is configured to generate a plurality of gamma voltages,*

*wherein each of the gamma voltage generators comprises a multiplexer being connected to the m common output terminals, the multiplexer is configured to select m common gamma voltages among the gamma voltages generated by a corresponding one of the gamma voltage generators, and the multiplexer is further configured to output the selected m common gamma voltages to the m common output terminals.*

*19. The display driver of claim 18, further comprising:*

*a plurality of source drivers, each of the source drivers is coupled to a corresponding gamma voltage generator and configured to drive a display panel according to the m common gamma voltages.*

*20. The display driver of claim 19, wherein*

*the m common gamma voltages are generated by either one of the gamma voltage generators, and*

*the m common gamma voltages are provided to all of the source drivers.*

*21. A display driver, comprising:*

*a first driving circuit, comprising a first gamma voltage generator configured to output a first gamma voltage to a first output terminal,*

*a second driving circuit, comprising a second gamma voltage generator configured to output a second gamma voltage to a second output terminal corresponding to the first output terminal,*

*wherein the first output terminal and the second output terminal form a common output terminal, and a common gamma voltage of the first gamma voltage and the second gamma voltage is outputted to the common output terminal, wherein*

*the first gamma voltage generator comprises a first multiplexer connected to the common output terminal,*

*the second gamma voltage generator comprises a second multiplexer connected to the common output terminal,*

*the first multiplexer and the second multiplexer are configured to select the common gamma voltage among the first gamma voltage and the second gamma voltage, and*

*the common gamma voltage is generated by either the first gamma voltage generator or the second gamma voltage generator.*

*22. The display driver of claim 21, wherein*

*the first driving circuit further comprises a first source driver being coupled to the first gamma voltage generator, the first source driver is configured to drive a display panel according to the common gamma voltage,*

*the second driving circuit further comprises a second source driver being coupled to the second gamma voltage generator, the second source driver is configured to drive the display panel according to the common gamma voltage.*

*23. The display driver of claim 22, wherein*

*the common gamma voltage is generated by either the first gamma voltage generator or the second gamma voltage generator, and*

*the common gamma voltage is provided to both of the first source driver and the second source driver.*

*24. A display driver, comprising:*

*a plurality of gamma voltage generators, each gamma voltage generator comprises n output terminals and is configured to output n gamma voltages to the n output terminals, wherein each of the n output terminals of one of the gamma voltage generators is respectively corresponded to one of n output terminals of each of the other gamma voltage generators,*

*wherein m output terminals among the output terminals of the one of the gamma voltage generators are electrically coupled to the corresponding m output terminals among the n output terminals of each of the other gamma voltage generators to form m common output terminals, and m common gamma voltages from the gamma voltage generators are outputted to the m common output terminals, wherein n and m are natural numbers, and n is greater than m, wherein*

*each of the gamma voltage generators comprises a multiplexer being connected to the m common output terminals, the multiplexer is configured to select the m common gamma voltages among the n gamma voltages, and*

*each of the m common gamma voltages is generated by one of the gamma voltage generators.*

*25. The display driver of claim 24, further comprising:*

*a plurality of source drivers, each of the source drivers is coupled to a corresponding gamma voltage generator and configured to drive a display panel according to the m common gamma voltages.*

*26. The display driver of claim 25, wherein*

*the m common gamma voltages comprise a first common gamma voltage,*

*the first common gamma voltage is generated by one of the gamma voltage generators, and*

*the first common gamma voltage is provided to all of the source drivers.*

* * * * *